United States Patent [19]
Jau-Jiu et al.

[11] Patent Number: 5,511,060
[45] Date of Patent: Apr. 23, 1996

[54] MAGNETO-OPTICAL HEAD WITH A THREE PRISM BEAM SPLITTER TO SPLIT A REFLECTED BEAM INTO THREE BEAMS

[75] Inventors: Ju Jau-Jiu, Hsinchu; Wang Jinn-Kang, Taipei, both of Taiwan

[73] Assignee: Industrial Technology Research Institute, Taiwan

[21] Appl. No.: 356,668

[22] Filed: Dec. 15, 1994

Related U.S. Application Data

[63] Continuation of Ser. No. 24,153, Feb. 26, 1993, abandoned.
[51] Int. Cl.$^6$ ............................................. G11B 7/00
[52] U.S. Cl. .................. 369/118; 369/112; 369/110; 369/44.23; 369/13
[58] Field of Search ..................... 369/118, 112, 369/110, 109, 121, 122, 13, 44.12, 44.14, 44.38, 44.23

[56] References Cited

U.S. PATENT DOCUMENTS

| | | | |
|---|---|---|---|
| 4,873,678 | 10/1989 | Nakamura et al. | 369/112 |
| 5,060,212 | 10/1991 | Fujita et al. | 369/112 |
| 5,231,620 | 7/1993 | Ohuchida | 369/109 |
| 5,406,532 | 4/1995 | Nishikawa | 369/110 |
| 5,467,336 | 11/1995 | Ando et al. | 369/112 |

OTHER PUBLICATIONS

*Polarized Light;, Production and Use* Cap. 5 Birefringence Polarizers, pp. 70–71; Author: Schurcliff, William A.; Harvard University Press, 1962.

*Primary Examiner*—Georgia Y. Epps
*Assistant Examiner*—Kim-Kwok Chu
*Attorney, Agent, or Firm*—Marshall & Melhorn

[57] ABSTRACT

An optical system of reflected light path of a magneto-optical head, comprising very few parts that can be easily manufactured and assembled at a low cost. The present invention makes use of a beam splitter and a plane convex lens to simplify the optical system of a magneto-optical head such that the reflected beam coming from the plane convex lens is split into three light beams by the beam splitter. Among the three split light beams, two are reflected beams used for focus and track photodetection, and the other is a transmitted beam used for RF signal photodetection. A magneto-optical head with an optimized design as such can reduce the cost of manufacture and assembly. Due to the simplicity in structure, the optical parts according to the present invention can be assembled easily.

7 Claims, 13 Drawing Sheets

MAGNETO-OPTICAL HEAD WITH A THREE PRISM BEAM SPLITTER TO SPLIT A REFLECTED BEAM INTO THREE BEAMS

This application is a continuation of U.S. patent application Ser. No. 08/024,153, filed Feb. 26, 1993, now abandoned.

BACKGROUND OF THE INVENTION

1. Field of the Invention

The present invention relates to an optical system of reflected light path for a magneto-optical head, and more particularly to an optical system for a magneto-optical head comprising very few parts that can be manufactured and assembled at low cost.

2. Description of Prior Art

With advancements in Hi-Tech and diversification in the media for information or data storage and retrieval, magneto-optical disks are becoming more popular in applications for data storage and retrieval. Most of the optical disks currently used for information or data storage and retrieval are classified into a group we call WORM, meaning "write once, read memory".

Basically, it is necessary for the optical system of a magneto-optical head to detect three types of signal. The positions of an objective lens and an optical disk are detected from the focus signal. The precision-positioning of the control tracks of the objective-lens actuator is made possible by the detection of the track signal. When both the focus and track signal are accurate, the RF signal of an optical disk can be readily detected. To perform all these functions, conventional magneto-optical heads have a very complicated design and require a large number of optical parts to make up their optical systems. Due to the complex structure and the large number of optical parts employed, conventional magneto-optical heads require a lengthy process for assembly and incur a high cost of manufacture.

TABLE 1

| Magneto-Optical heads | Ease of Assembly | Units of BS or PBS | Units of lens | Other Components |
|---|---|---|---|---|
| Con 1 | difficult | 3 | 3 | knife-edge |
| Con 2 | difficult | 2 | 3 | knife-edge |
| Con 3 | difficult | 1 | 3 | wedge prism |
| Con 4 | difficult | 1 | 2 | wedge prism |
| Con 5 | difficult | 3 | 2 | knife edge |
| PI 1 | easy | 1 | 1 | PI 1 BS |
| PI 2 | easy | 1 | 1 | PI 2 BS |

Con: Conventional
PI: Present Invention
PBS: Polarized beam splitter
BS: Beam splitter Referring to Table 1, a table showing different characteristics of reflected light paths for different magneto-optical heads, different designs of reflected light paths for conventional magneto-optical heads (referring FIG. 1 through FIG. 5) and the magneto-optical head with the present invention (referring FIGS. 7 and 8) are compared and contrasted. The table clearly shows the simplicity in structure and ease in assembly for the magneto-optical head with the present invention in comparison to conventional magneto-optical heads. Most of the conventional magneto-optical heads employ more beam splitters than the magneto-optical head with the present invention. The magneto-optical head with the present invention employs only one lens while the conventional magneto-optical heads employ more than one lens (some even employ as many as three lens).

FIG. 1 through FIG. 5 are drawings showing different conventional magneto-optical heads. From these diagrams, it can be found that the designs of the optical systems for the conventional magneto-optical heads are complicated and require numerous optical parts. Therefore, the time of assembly for these conventional magneto-optical heads is longer and their cost of manufacture is higher.

Figure 1:
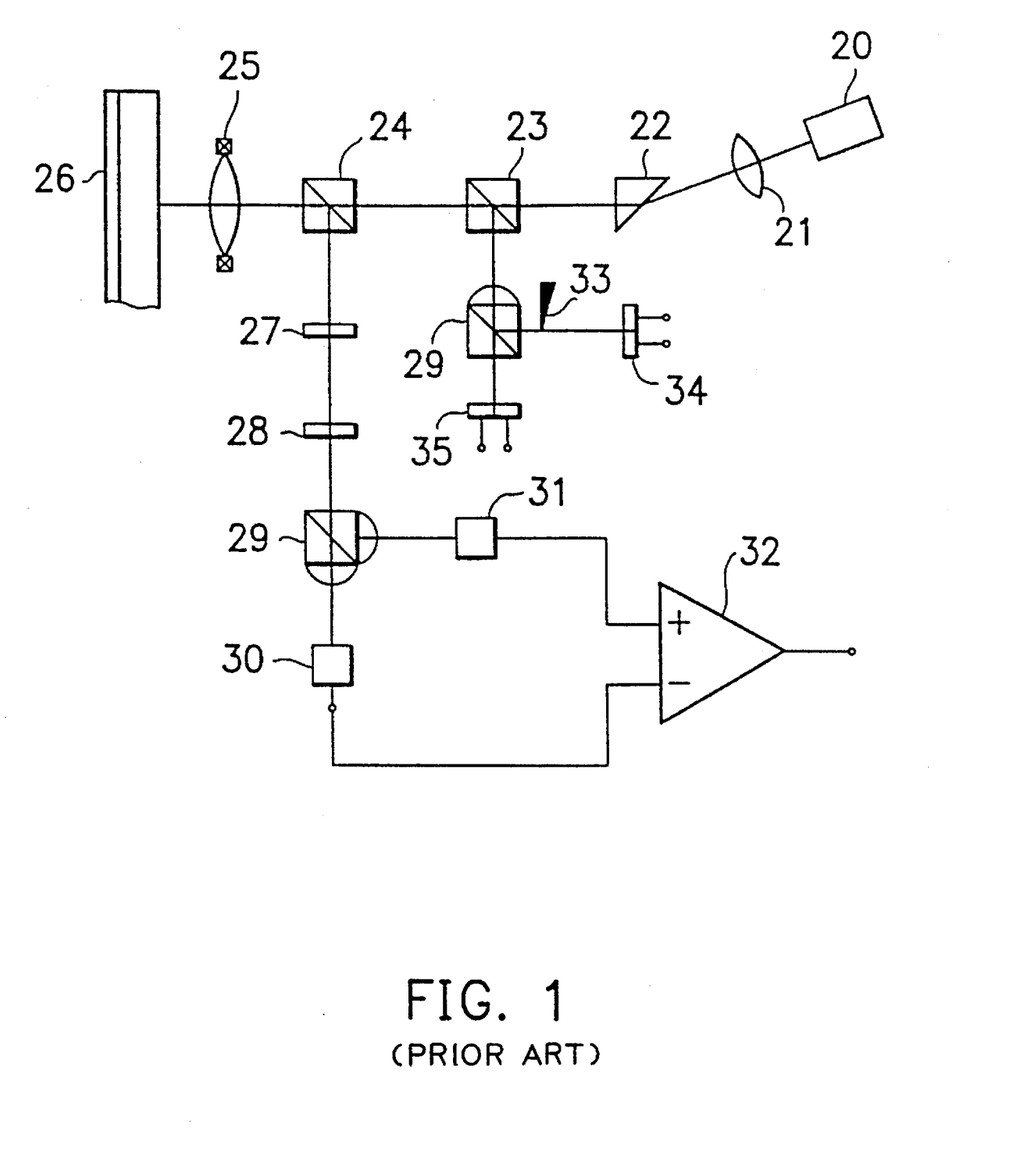
FIG. 1 is a diagram showing a first conventional magneto-optical head.

FIG. 1 is a diagram showing a first conventional magneto-optical head. The first conventional magneto-optical head is shown to comprise a laser diode 20, a collimator 21, a prism 22, two beam splitters 23, 24, an objective lens actuator 25, a compensation plate 27, a half-wave plate 28, two polarized beam splitters 29, two signal detectors 30, 31, a differential amplifier 32, a knife-edge 33, a focus error detector 34, and a tracking error detector 35. The arrows shown in the diagram indicate the paths of the laser beam. Numeral 26 denotes a magneto-optical disk.

Figure 2:
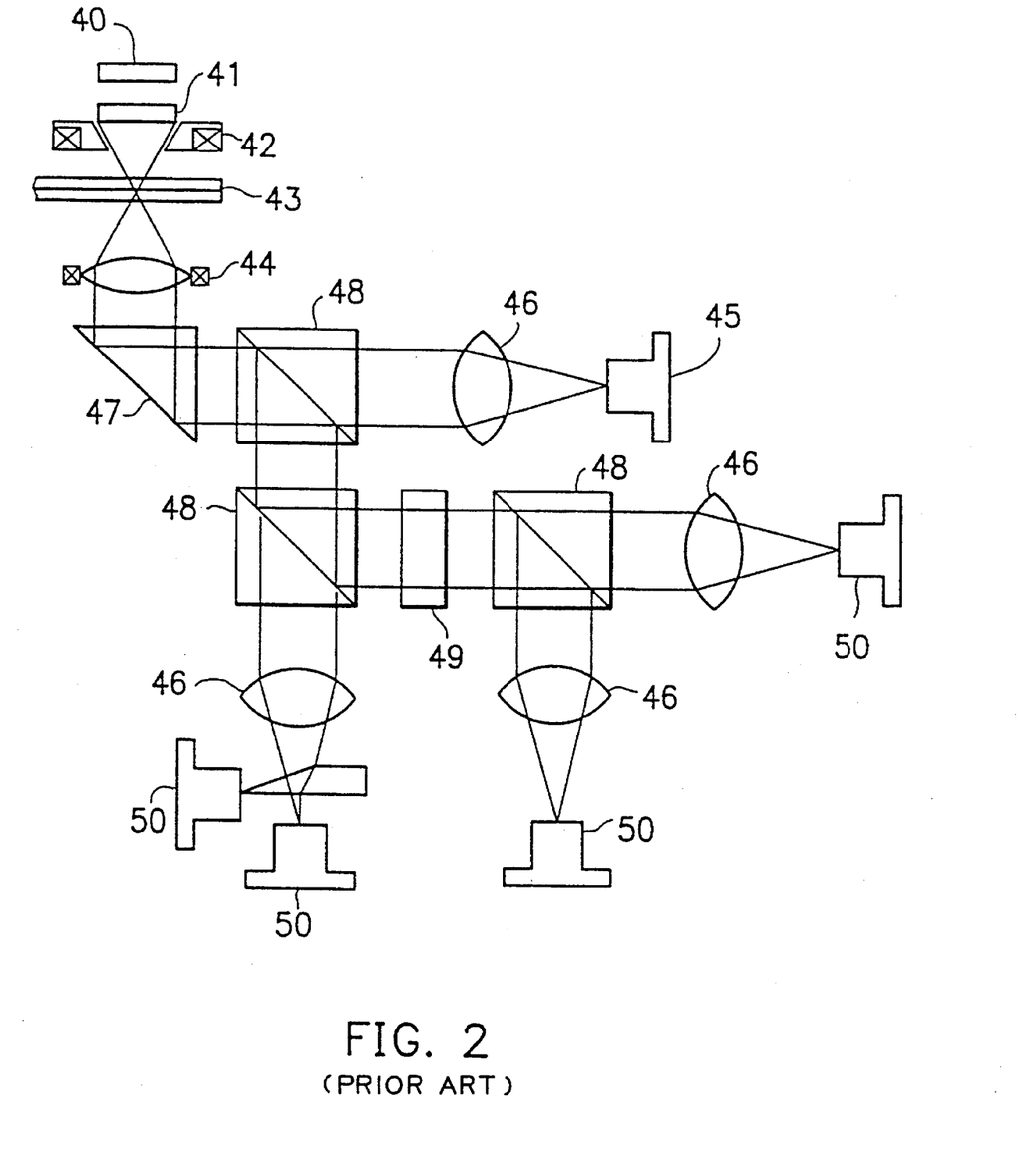
FIG. 2 is a diagram showing a second conventional magneto-optical head.

FIG. 2 is a diagram showing a second conventional magneto-optical head. The second conventional magneto-optical head is shown to comprise a quadrant photo diode 40, a quadrant analyzer 41, an electromagnet 42, an objective lens actuator 44, a laser diode 45, a collimator 46, a prism 47, a beam splitter 48, and a half-wave plate 49 and two PIN photo diodes 50. The dotted lines shown in the diagram indicate the paths of the laser beam. Numeral 43 denotes a magneto-optical disk.

Figure 3:
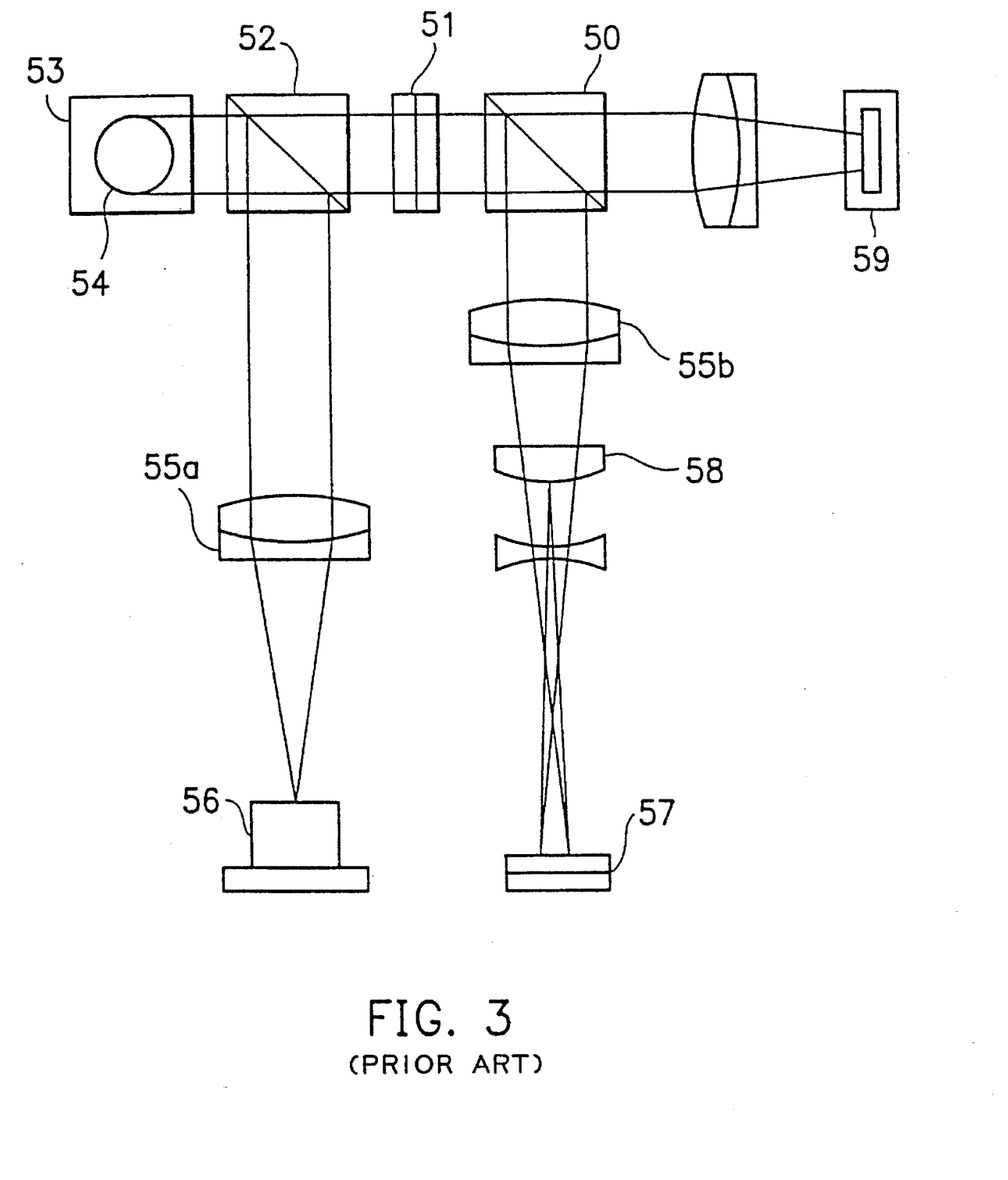
FIG. 3 is a diagram showing a third conventional magneto-optical head.

FIG. 3 is a diagram showing a third conventional magneto-optical head. The third conventional magneto-optical head is shown to comprise a polarized beam splitter 50, a half-wave plate 51, a beam splitter 52, a mirror 53, an objective lens 54, a first and second collimating lens 55a and 55b, a laser diode 56, a PIN photodetector 57 for signal and focus error detection, a wedge prism 58, and a PIN photodetector 59 for signal and radial error detections. The arrows shown in the diagram show the paths of the laser beam.

Figure 4:
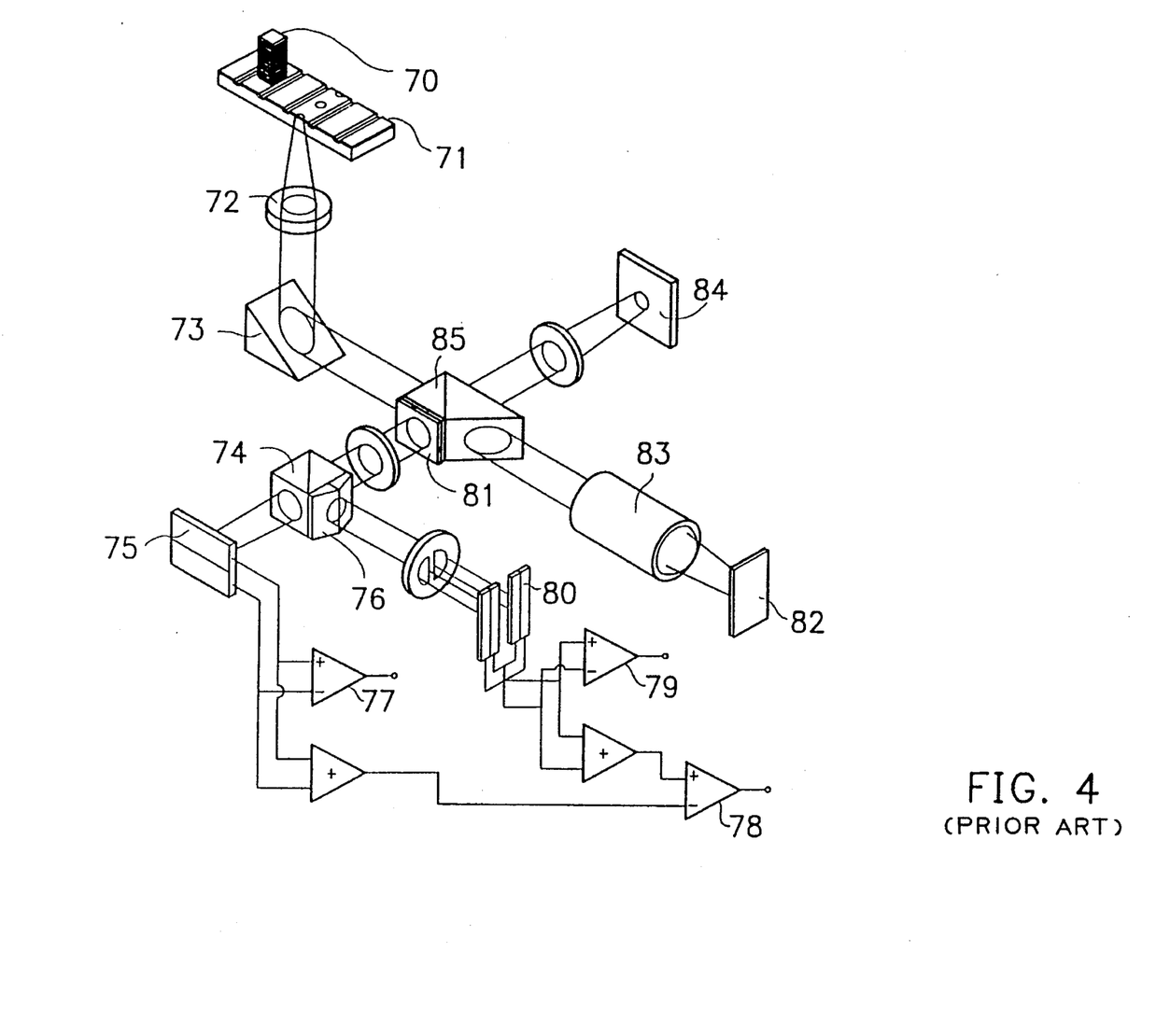
FIG. 4 is a diagram showing a fourth conventional magneto-optical head.

FIG. 4 is a diagram showing a fourth conventional magneto-optical head. The fourth conventional magneto-optical head is shown to comprise an objective lens 72, a deflection prism 73, a polarized beam splitter 74, a split photodetector 75, a wedge prism 76, a quadrant photodetector 80, a half-wave plate 81, a laser diode 82, a collimating lens 83, an APC photodetector 84, and a beam splitter 85. Numerals 70, 71 denotes an electromagnetic coil, and a magneto-optical disk.

Figure 5:
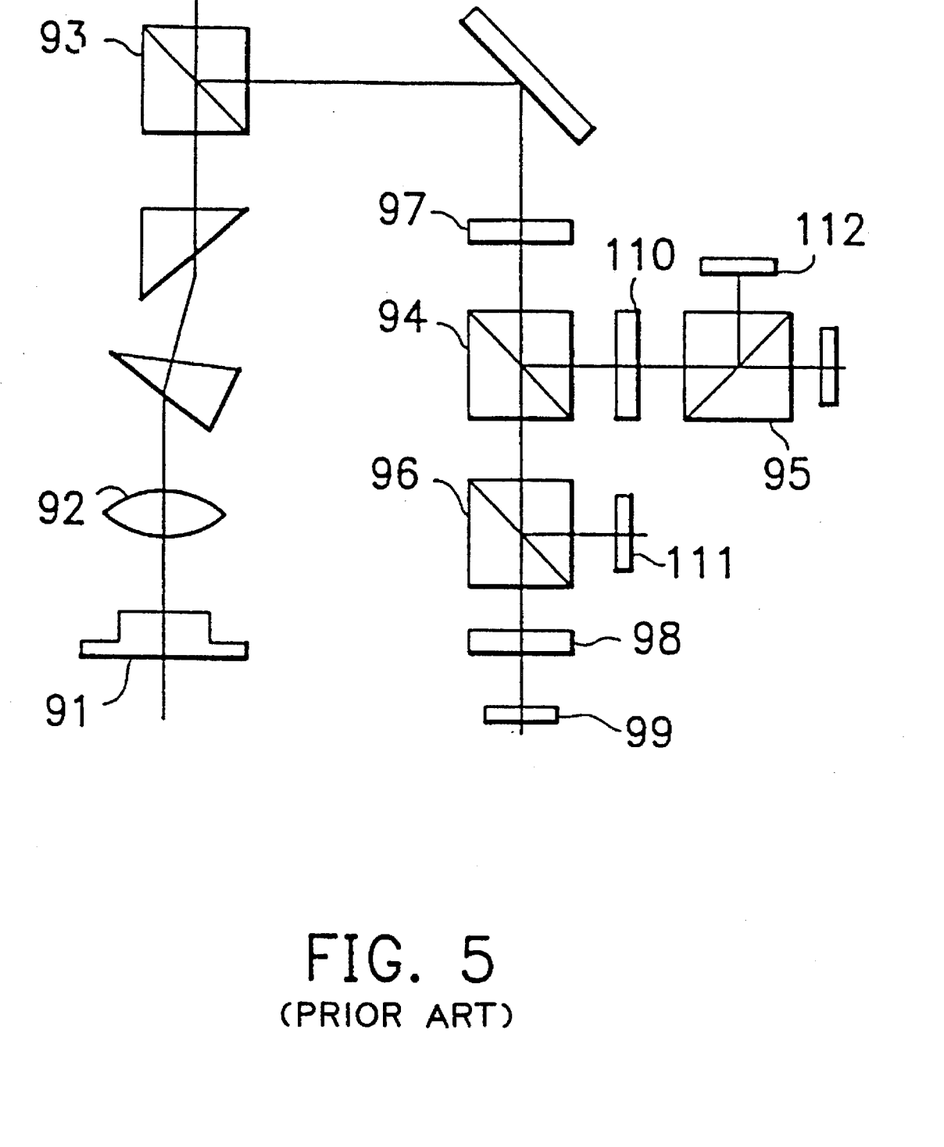
FIG. 5 is a diagram showing a fifth conventional magneto-optical head.

FIG. 5 is a diagram showing a fifth conventional magneto-optical head. The fifth conventional magneto-optical head is shown to comprise a laser diode 91, a collimator 92, three polarized beam splitters 93, 94, 95, a convex lens 97, a cylindrical lens 98, two quadrant PIN photodiode 99 and 111, a half-wave plate 110, and a PIN photodiode 112. The dotted lines show in the diagram show the paths of the laser beam.

SUMMARY OF THE INVENTION

The primary object of the present invention is to provide an optical system of reflected light path for magneto-optical heads with optimized design comprising very few parts that can be easily manufactured at low cost.

According to the present invention, an optical system of reflected light path of a magneto-optical head for splitting a light beam reflected from a magneto-optical disk into three beams for track, RF and focus signal photodetection respectively, comprising a plane convex lens for receiving and focusing the light beam reflected from magneto-optical disk; and a beam splitter including three triangular prism for receiving the light beam coming from the plane convex lens. The light beam enters a simultaneous area of the three triangular cubic prisms and is split The light beam enters a simultaneous area of the three triangular cubic prisms and is split into three beams. The simultaneous area of the three prisms represents the place where an incident light can simultaneously reach onto the three prisms. It should be noted that the light beam is provided with a knife-edge effect since the light beam is projected onto the plane convex lens and focus onto the simultaneous area of the three prisms which form the beam splitter to split into three beams. Therefore, the optical system of the present invention can be used as a magneto-optical head. The beam splitter has a coating satisfying the following conditions:

$T_p \geq 80\%$ $R_s \geq 5\%$ $R_s + T_s \approx 1$ where, $T_p$ is transmittance of the horizontal polarization beam transmitted through the beam splitter, $R_s$ is reflectance of the vertical polarization beam reflected from the beam splitter, and $T_s$ is the transmittance of the vertical polarization beam transmitted through the beam splitter.

According to the present invention, an optical system of a WORM optical head for splitting a light beam reflected from optical disk into three beams for track, RF and focus signal photodetection respectively, comprises a plane convex lens for receiving and focusing the light beam reflected from optical disk; and a beam splitter for receiving the light beam coming from the plane convex lens and splitting the light beam into three beams. The beam splitter of the present invention has a coating satisfying the following conditions:

$R > 5\%$ $R + T \approx 1$ where,

R is the reflectance of the beam reflected from the beam splitter, and

T is the transmittance of the beam transmitted from the beam splitter.

It should be noted that the beam splitting effect of the beam splitter in this invention is independent of the size of the beam splitter, so that the size of the magneto-optical head can be reduced.

BRIEF DESCRIPTION OF THE DRAWINGS

The present invention can be more fully understood by referring to the following detailed description and accompanying drawings, which form an integral part of this application:

FIG. 10 is a diagram illustrating the principle that the present invention is based on;

DETAILED DESCRIPTION OF THE PREFERRED EMBODIMENT

Figure 6:
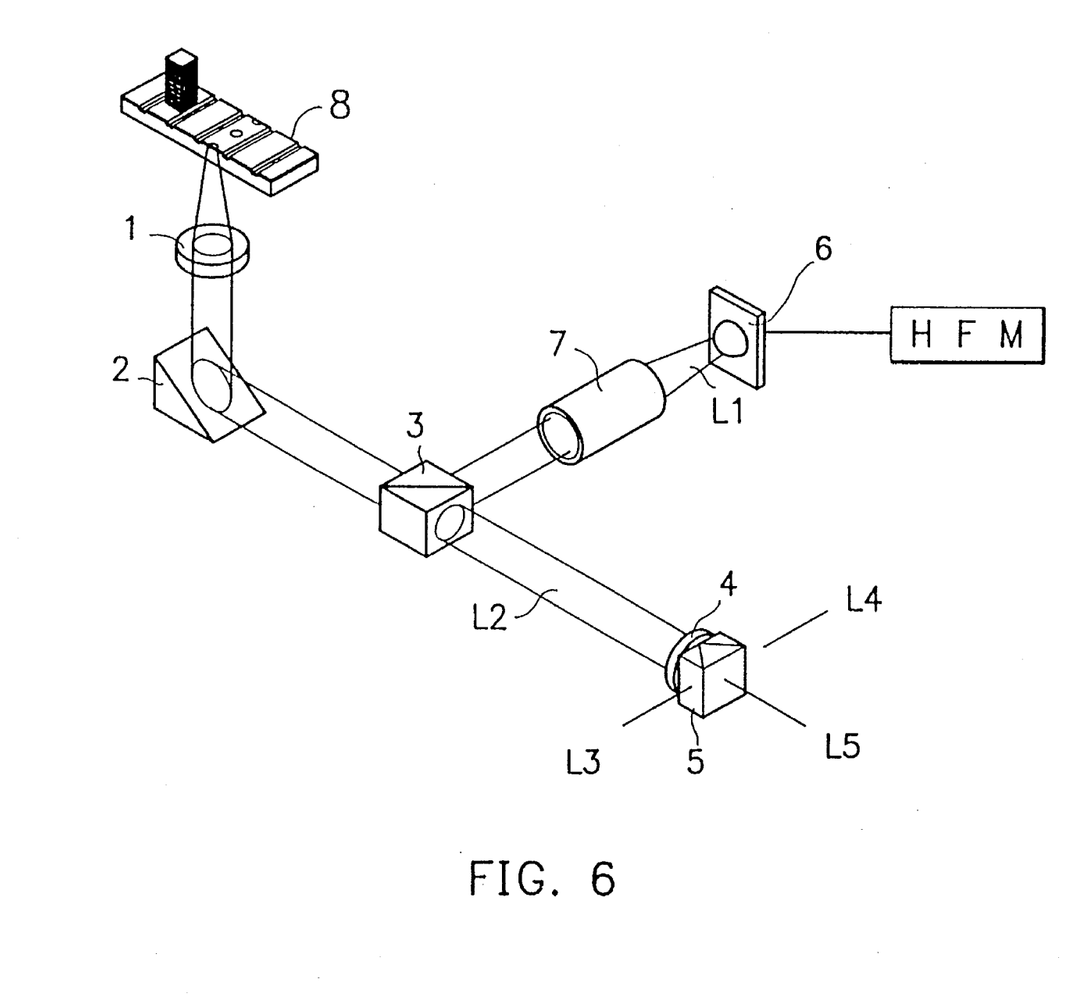
FIG. 6 is a schematic diagram illustrating a magneto-optical head according to the present invention.

Referring to FIG. 6, a schematic diagram illustrating a magneto-optical head according to the present invention. From the diagram, it can be seen that the present invention comprises an actuator 1, a mirror 2, a polarized beam splitter 3, a plane convex lens 4, a beam splitter 5, a laser-diode 6, and a collimator 7. Laser beam L1 omitted from the laser diode 6 passes through the collimator 7, the polarized beam splitter 3, the mirror 2, and the actuator 1 (actuating the objective lens) to project onto the magneto-optical disk 8. Laser beam L2 reflected from the magneto-optical disk 8 is projected onto the plane convex lens 4 and focused onto the simultaneous area of the three prisms which form the beam splitter 5 to split into three beams, two of which are reflected beams (L3 & L4) used respectively for track and focus photodetection, and the transmitted beam (L5) is used for RF photodetection.

Figure 7:
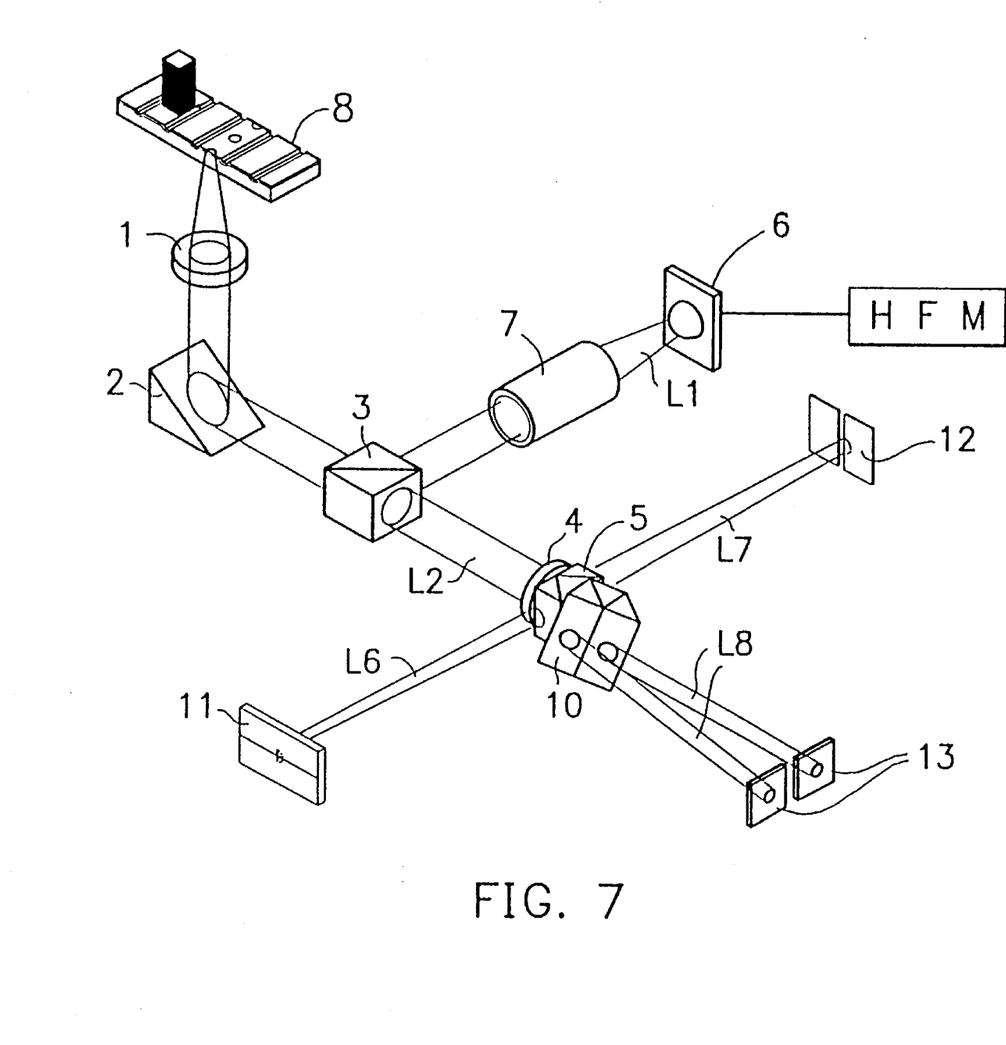
FIG. 7 is a diagram illustrating a first preferred embodiment with a magneto-optical head according to the present invention.

Referring to FIG. 7, a diagram illustrating a first preferred embodiment with a magneto-optical head according to the present invention. From the diagram, it can be seen that the present invention comprises an actuator 1, a mirror 2, a polarized beam splitter 3, a plane convex lens 4, a beam splitter 5, a laser-diode 6, a collimator 7, a polarized beam splitter 10, a track photodetector 11, a focus photodetector 12, and an RF photodetector 13. Laser beam L1 emitted from the laser diode 6 passes through the collimator 7, the polarized beam splitter 3, the mirror 2, and the actuator 1 (actuating the objective lens) to project onto the magneto-optical disk 8. Laser beam L2 reflected from the magneto-optical disk 8 is projected onto the plane convex lens 4 and focused onto the simultaneous area of the three prism which form the beam splitter 5 to split into three beams, two of which are reflected beams (L6 & L7) used respectively for track and focus photodetection, and the transmitted beam (LB) is used for RF photodetection.

Figure 8:
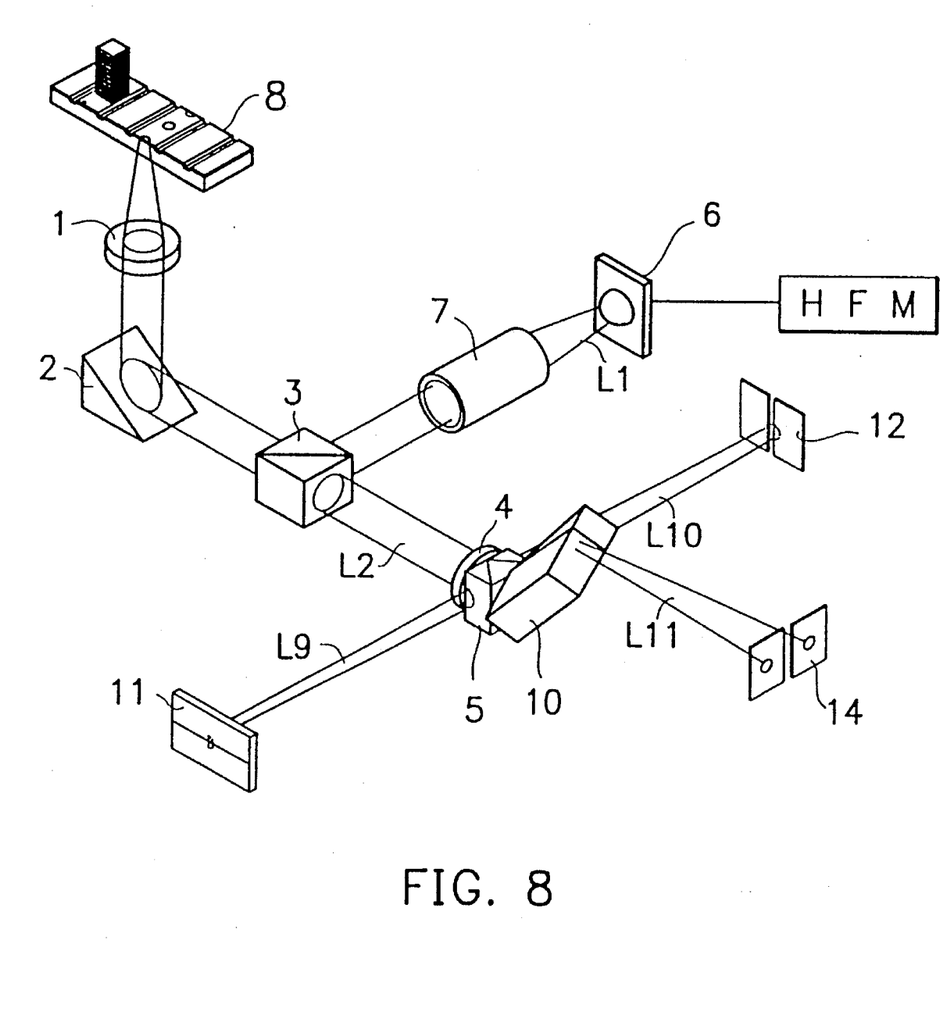
FIG. 8 is a diagram illustrating a second preferred embodiment with a magneto-optical head according to the present invention.

Referring to FIG. 8, a diagram illustrating a second preferred embodiment with a magneto-optical head according to the present invention. From the diagram, it can be seen that the present invention comprises an actuator 1, a mirror 2, a polarized beam splitter 3, a plane convex lens 4, a beam splitter 5, a laser-diode 6, a collimator 7, a polarized beam splitter 10, a track photodetector 11, a focus photodetector 12, and an RF photodetector 14. Laser beam L1 emitted from the laser diode 5 passes through the collimator 6, the polarized beam splitter 3, the mirror 2, and the actuator 1 (actuating the objective lens) to project onto the magneto-optical disk 8. Laser beam L2 reflected from the magneto-optical disk 8 is projected onto the plane convex lens 4 and focused onto beam splitter 5 to split into three beams, two of which are reflected beams (L9 & L10) used respectively for track and focus photodetection, and the transmitted beam (L11) is used for RF photodetection.

For the first and second preferred embodiments as shown in FIG. 7 and FIG. 8, a polarized beam splitter 10 is added to the structure because differential detection for magneto-optical readout is employed and element 10 must be rotated 45°.

Figure 9:
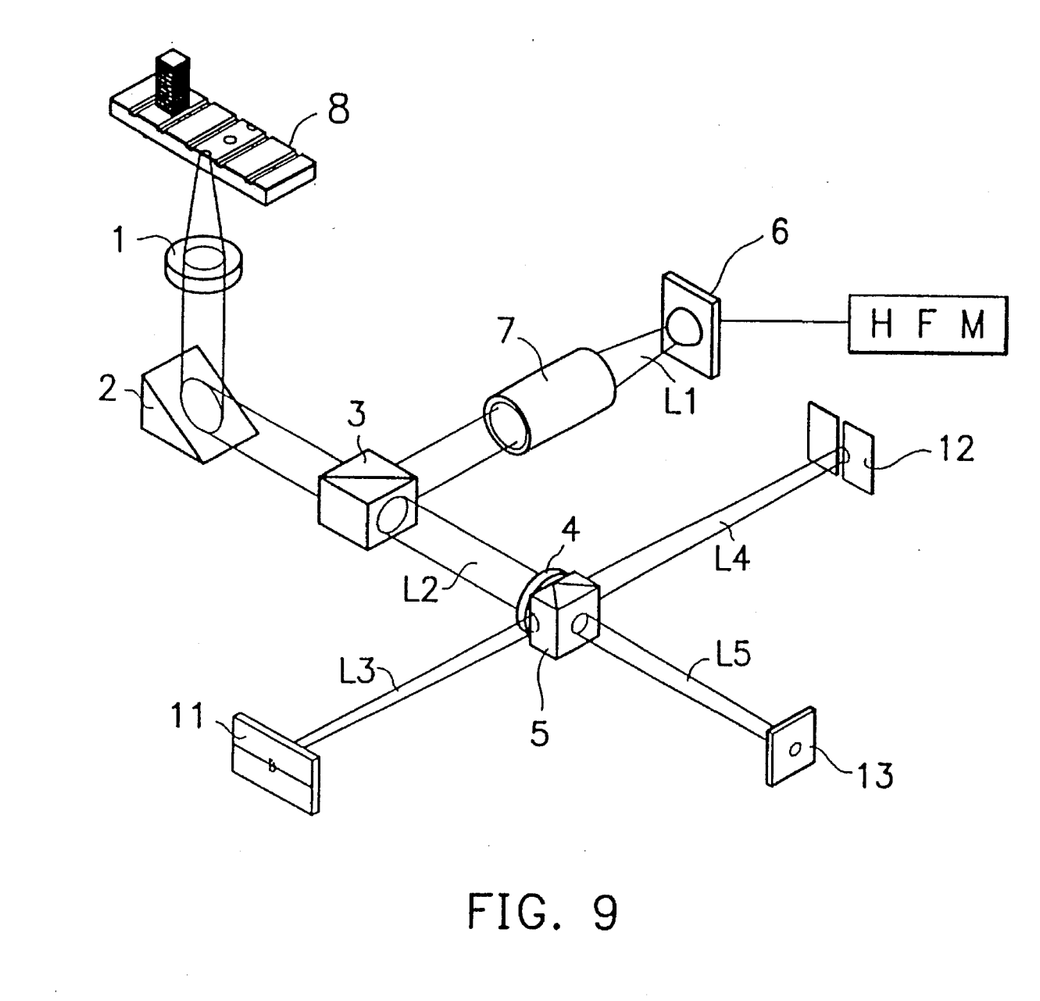
FIG. 9 is a diagram illustrating a third preferred embodiment with a WORM magneto-optical head according to the present invention.

With reference to FIG. 9, a diagram illustrating a third preferred embodiment with a WORM head according to the present invention. From the diagram, it can be seen that the present invention comprises an actuator 1, a mirror 2, a polarized beam splitter 3, a plane convex lens 4, a beam splitter 5, a laser-diode 6, and a collimator 7, a track photodetector 11, a focus photodetector 12, and an RF photodetector 13. Laser beam L1 emitted from the laser diode 6 passes through the collimator 7, the polarized beam splitter 3, the mirror 2, and the actuator 1 (actuating the objective lens) to project onto the magneto-optical disk 8. Laser beam L2 reflected from the magneto-optical disk 8 is projected onto the plane convex lens 4 and focused onto the simultaneous area of the three prisms which form the beam splitter 5 to split into three beams, two of which are reflected beams (L3 & L4) used respectively for track and focus photodetection, and the transmitted beam (L5) is used for RF photodetection.

Figure 10:
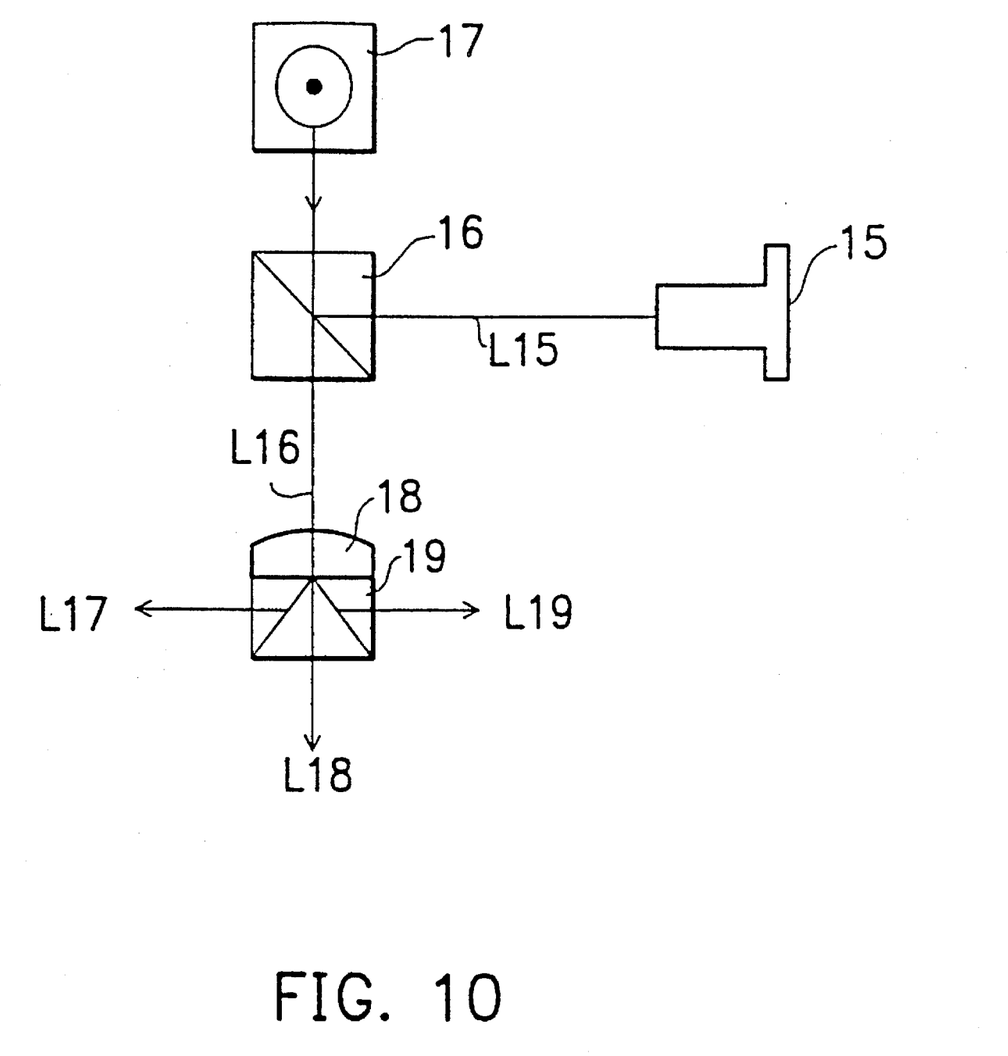

Refer to FIG. 10, a diagram illustrating the principle which the present invention is based on. From the diagram, it can be seen that the reflected beam L16 of laser beam L15 emitted from the laser diode 15 passed through a collimator (not shown in the diagram), a focus lens 18 and a rectangularly shaped beam splitter 19 to split into three beams, two of which are reflected beams L17 and L19 used respectively for track and focus photodetection and the other is a transmitted beam L18 used for RF photodetection. Because of the nature of magneto-optical signal, the rectangular shape beam splitter 19 is required to meet the condition:

$T_p \geq 80\%$ (the better for $T_p$ is approximately 1), and the proportions of $R_s$ and $T_s$ are to be determined by the respective requirements for servo and RF signal, where, $T_p$ is transmittance of the horizontal polarization beam transmitted through the beam splitter, $R_s$ is reflectance of the vertical polarization beam reflected from the beam splitter, and $T_s$ is the transmittance of the vertical polarization beam transmitted through the beam splitter.

If the efficiency for the photodetector to convert light energy into electricity is set at 0.5 μA/μW and the lower limit for the servo signal (focus and track signal) is set at 0.5 μA (the light energy received by the photodetector is 1 μW), then the reflection index for the $R_s$ should meet the following requirements:

$R_s \geq 5\%$ $R_s + T_s \approx 1$

Figure 11:
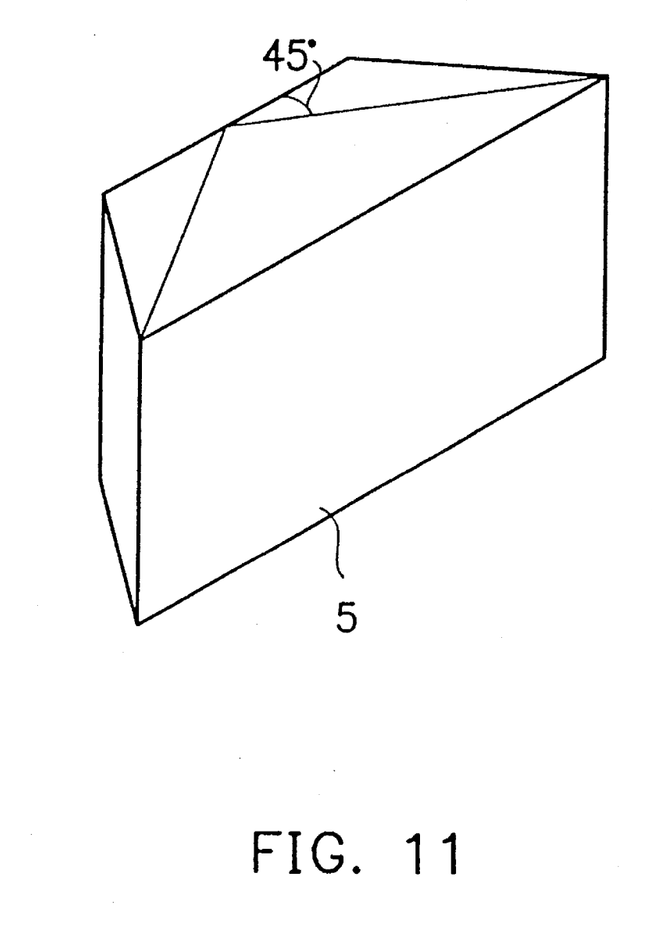
FIG. 11 is a schematic diagram of the beam splitter of the present invention.

FIG. 11 is a schematic diagram of the beam splitter of the present invention. The beam splitter is a quadrangle including three triangular cubic prism. If one side angle of the triangular cubic prism is 45°, the result will be better, which is as shown in FIG. 11.

Figure 12:
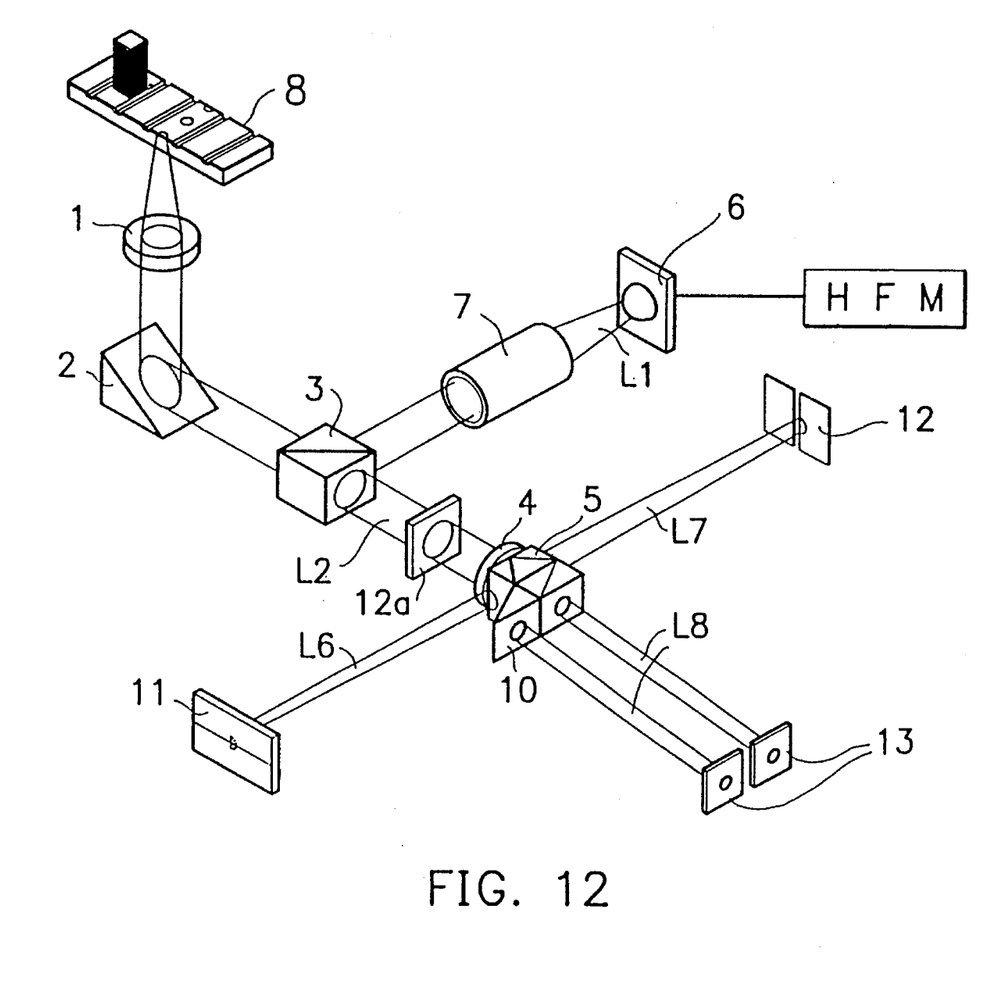
FIG. 12 is a schematic diagram of FIG. 7 after adding a half-plate.

FIG. 12 is a schematic diagram of FIG. 7 after adding a half-plate. In which, 12a indicates a half plate, the adding of this half plate can rotate the beam splitter 5 and the polarized beam splitter 10 into horizontal.

Figure 13:
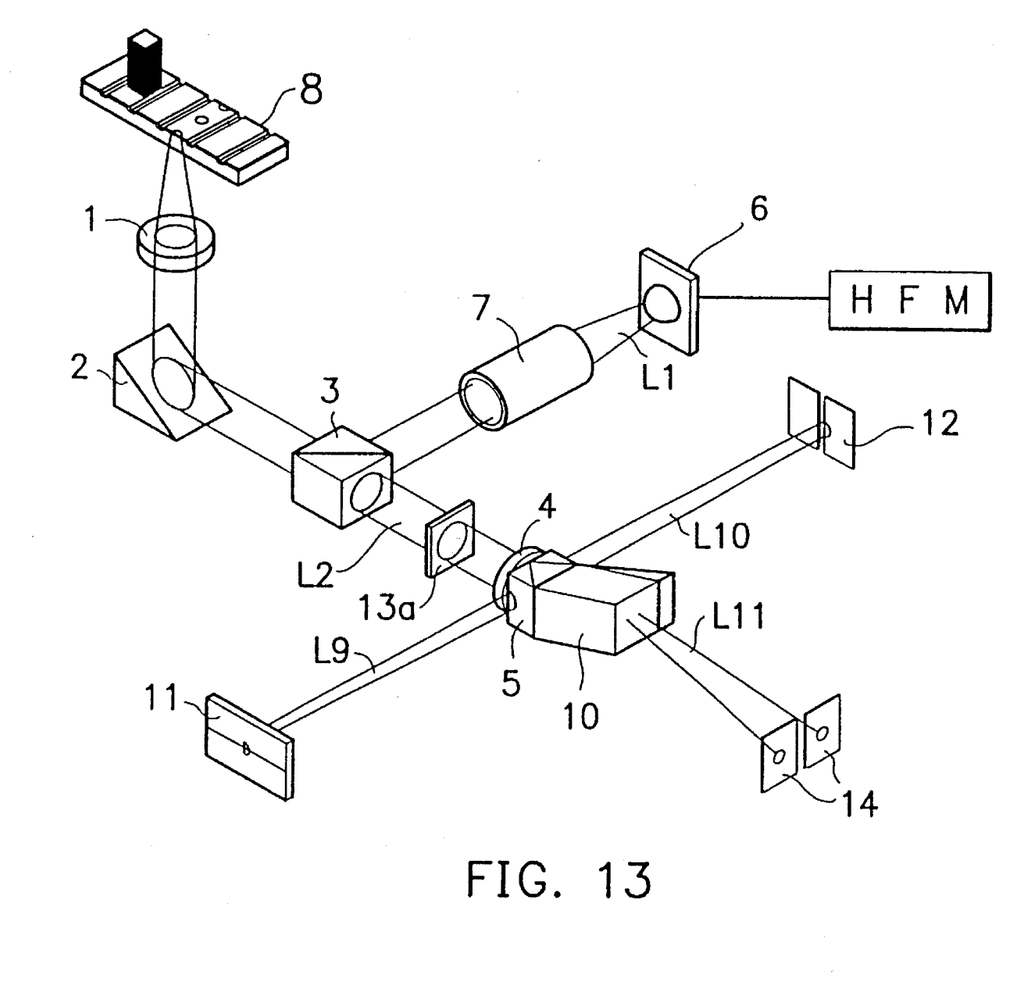
FIG. 13 is a schematic diagram of FIG. 8 after adding a half-plate.

FIG. 13 is a schematic diagram of FIG. 8 after adding a half-plate. In which, 13a indicates a half plate. The adding of can rotate the polarized beam splitter 10 into horizontal.

The present invention makes use of a beam splitter and a plane convex lens to simplify the optical system of a magneto-optical head such that the reflected beam coming from the plane convex lens is split into three light beams by the beam splitter. Among the three split light beams, two are reflected beams used for focus and track photodetection, and the other is a transmitted beam used for RF signal photodetection. A magneto-optical head with an optimized design as such can significantly reduce the cost of manufacture and assembly.

While the invention has been described in terms of what is considered to be the most, practical and preferred embodiment, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. A magneto-optical information system of reflected light path of a magneto-optical head, for splitting a light beam reflected from a magneto-optical disk into three light beams for tracking, data reproducing and focusing respectively, comprising;

(a) a convex lens for receiving and focusing the light beam reflected from the magneto-optical disk; and (b) a beam splitter for receiving the reflected light beam coming from said convex lens add splitting said light beam into three orthogonal light beams, said beam splitter being a quadrangle including a three triangular cubic prism, where a side angle in one of the triangular cubic prisms for reflecting the light path of said focus signal photo detection is 45°, and wherein said beam splitter includes a coating satisfying the follow conditions:

$T_P \geq 80\%$ $R_S \geq 5\%$ $R_S + T_S \approx 1$ where, $T_P$ is the transmittance of a horizontal polarization beam transmitted through said beam splitter, $R_S$ is a reflectance of the vertical polarization beam reflected from said beam splitter, and $T_S$ is the transmittance of the vertical polarization beam transmitted through said beam splitter.

2. An optical system of reflected light path of a magneto-optical head as set forth in claim 1, wherein said convex lens is a plane convex lens.

3. The optical system of reflected light path of a magneto-optical head defined in claim 1, wherein said beamsplitter is of a trapezoidal cross-section.

4. A magneto-optical head for reading information recorded on a reflective medium comprising;

(a) a laser source for generating a laser beam;

(b) a polarization beam splitter mounted between said laser source and said reflective medium for deflecting the laser beam;

(c) an actuator means for directing the laser beam to said reflective mediums:

(d) a convex lens for receiving a reflected laser beam from said reflective medium;

(e) a second beam splitter comprising a rectangular shaped prism, including three triangular cubic prisms and a coating, for receiving the laser beam reflected from said reflective medium and for splitting the reflected laser beam into three orthogonal light beams, each orthogonal to each other, a first reflected beam used for tracking photodetection, a transmitted beam for data reproducing photodetection, and a beam for focusing; and (f) a half plate for rotating said polarized beam splitter and said second beam splitter wherein said second beam splitter includes a coating satisfying the following condition;

$$T_P \geq 80\%$$

$$R_S \geq 5\%$$

$$R_S + T_S \cong 1$$

where, $T_P$ is the transmittance of a horizontal polarization beam transmitted through said second beam splitter, $R_S$ is the reflectance of a vertical polarization beam reflected from said second beam splitter, and $T_S$ is the transmittance of a vertical polarization beam transmitted through said second beam splitter.

5. The optical system of reflected light path of a magneto-optical head defined in claim 4, wherein said beamsplitter is of a trapezoidal cross-section.

6. A magneto-optical information system of reflected light path of a WORM optical head for splitting a light beam reflected from an optical disk into three light beams for tracking, data reproducing and focusing the respectively, comprising (a) a convex lens for receiving and focusing the light beam reflected from the optical disk; and (b) a beam splitter for receiving the light beam coming from said convex lens and splitting said reflected light beam into three orthogonal light beams, said beam splitter including a coated prism formed by three triangular cubic prisms, wherein a side angle in one of the triangular cubic prisms for reflecting the light path of said focus signal photo detection is 45°, and wherein beam splitter has a coating satisfying the following conditions:

$$R > 5\%$$

$$R + T \cong 1$$

where, R is the reflectance of a beam reflected from said beam spitter, and T is the transmittance of a vertical polarization beam transmitted through said beam splitter.

7. An optical system of reflected light path of a magneto-optical head as set forth in claim 6, wherein said convex lens is a plane convex lens.

* * * * *